United States Patent [19]
Akamatsu et al.

[11] Patent Number: 5,961,876
[45] Date of Patent: Oct. 5, 1999

[54] ORGANOPOLYSILOXANE COMPOSITION FOR VISCOUS FLUID COUPLINGS

[75] Inventors: Shoji Akamatsu; Mari Tateishi; Toshinori Watanabe, all of Chiba Prefecture, Japan

[73] Assignee: Dow Corning Toray Silicone Co., Ltd., Tokyo, Japan

[21] Appl. No.: 09/052,702

[22] Filed: Mar. 31, 1998

[30] Foreign Application Priority Data

Mar. 31, 1997 [JP] Japan .................................. 9-096474

[51] Int. Cl.⁶ ............................. C08K 3/10; C09K 5/00
[52] U.S. Cl. ........................................ 252/78.3; 524/785
[58] Field of Search ............................ 252/78.3; 524/785

[56] References Cited

U.S. PATENT DOCUMENTS

| | | | |
|---|---|---|---|
| 4,637,889 | 1/1987 | Kishimoto et al. | 252/75 |
| 4,640,792 | 2/1987 | Groenhof et al. | 252/78.3 |
| 4,772,409 | 9/1988 | Mori et al. | 252/78.3 |
| 5,319,010 | 6/1994 | Mitani et al. | 524/252 |
| 5,656,577 | 8/1997 | Kato et al. | 508/210 |
| 5,747,429 | 5/1998 | Katoh et al. | 508/208 |

FOREIGN PATENT DOCUMENTS

| | | |
|---|---|---|
| 55-18457 | 5/1980 | Japan . |
| 4-11696 | 1/1992 | Japan . |
| 9-176487 | 7/1997 | Japan . |

*Primary Examiner*—David W. Wu
*Assistant Examiner*—Caixia Lu Rutt
*Attorney, Agent, or Firm*—Catherine U. Brown; Sharon K. Severance; Timothy J. Troy

[57] ABSTRACT

An organopolysiloxane composition for viscous fluid couplings permits little torque variation even when used at a high temperature for an extended period of time. The organopolysiloxane composition comprises an organopolysiloxane liquid with a viscosity of 100 to 1,000,000 sq. mm/s and a platinum compound in an amount such that the amount of platinum metal relative to the liquid is 0.1 to 1,000 ppm. The organopolysiloxane liquid is typically a trimethylsiloxy-endblocked polydimethylsiloxane.

7 Claims, No Drawings

ORGANOPOLYSILOXANE COMPOSITION FOR VISCOUS FLUID COUPLINGS

FIELD OF THE INVENTION

This invention relates to an organopolysiloxane composition for viscous fluid couplings. More particularly, this invention relates to an organopolysiloxane composition for viscous fluid couplings that permits little torque variation even when used at a high temperature for an extended period of time.

BACKGROUND OF THE INVENTION

JP-C-55-18457 (1980) and U.S. Pat. No. 4,772,409 issued to Mori et al. disclose an organopolysiloxane composition for viscous fluid couplings that consists of an organopolysiloxane liquid and an organopolysiloxane having aromatic amino groups.

U.S. Pat. No. 4,637,889 issued to Kishimoto et al. on Jan. 20, 1987 discloses an organopolysiloxane composition for viscous fluid couplings consisting of an organopolysiloxane liquid, an organosiloxane compound containing zirconium atoms, and an organosiloxane compound containing cerium atoms.

JP-A-04-11696 (1992) discloses an organopolysiloxane composition for viscous fluid couplings consisting of an organopolysiloxane liquid and an organopolysiloxane having at least one silicon-bonded group selected from the group made up of carboxyalkyl groups, halogen-substituted aryl groups, halogen-substituted alkyl groups, and alkyl groups with a carbon number of 5 to 20.

U.S. Pat. No. 5,319,010 issued to Mitani et al. on Jun. 7, 1994 discloses an organopolysiloxane composition for viscous fluid couplings consisting of an organopolysiloxane liquid and an N,N-diaryl-p-arylenediamine compound.

However, all of these organopolysiloxane compositions have the defect that using them at a high temperature for an extended period of time leads to increased torque variation and loss of fluid coupling functionality.

The object of this invention is to provide an organopolysiloxane composition for a viscous fluid coupling that permits little torque variation even when used at a high temperature for an extended period of time.

SUMMARY OF THE INVENTION

This invention pertains to an organopolysiloxane composition for viscous fluid couplings consisting essentially of an organopolysiloxane liquid and a platinum compound in an amount such that platinum metal constitutes 0.1 to 1,000 ppm by weight, relative to the liquid. This composition permits little torque variation even when used at a high temperature for an extended period of time.

DETAILED DESCRIPTION OF THE PREFERRED EMBODIMENTS

This invention relates to an organopolysiloxane composition for viscous fluid couplings consisting essentially of an organopolysiloxane liquid and a platinum compound. The groups bonded to silicon atoms in the organopolysiloxane liquid are selected from the group consisting of alkyl, alkenyl, aryl, halogenated alkyl, aralkyl, and other substituted or unsubstituted monovalent hydrocarbon groups.

Suitable alkyl groups are exemplified by methyl, ethyl, propyl, isopropyl, and butyl groups. Suitable alkenyl groups are exemplified by vinyl, allyl, butenyl, and pentenyl groups. Suitable aryl groups are exemplified by phenyl, tolyl, and xylyl groups. Suitable aralkyl groups are exemplified by benzyl and phenetyl. Suitable halogenated alkyl groups are exemplified by 3,3,3-trifluoropropyl. Methyl and phenyl groups are preferred.

The molecular structure of the organopolysiloxane liquid can be a straight-chain, a straight-chain with partial branching, a branched-chain, or a ring structure. The organopolysiloxane liquid is exemplified by: trimethylsiloxy-endblocked dimethylpolysiloxane, trimethylsiloxy-endblocked copolymer of methylphenylsiloxane and dimethylsiloxane, trimethylsiloxy-endblocked copolymer of diphenylsiloxane and dimethylsiloxane, dimethylphenylsiloxy-endblocked copolymer of methylphenylsiloxane and dimethylsiloxane, and dimethylphenylsiloxy-endblocked copolymer of diphenylsiloxane and dimethylsiloxane.

From the standpoint of torque transfer, the viscosity of the organopolysiloxane liquid at 25° C. is preferably 100 to 1,000,000 sq mm/s. More preferably, viscosity is 500 to 500,000 sq mm/s.

The organopolysiloxane liquid used in this invention can be only one type of organopolysiloxane liquid, or it can be a mixture of two or more organopolysiloxane liquids with different viscosities, silicon-bonded groups, and molecular structures. Using a combination of a high-viscosity organopolysiloxane liquid and a low-viscosity organopolysiloxane liquid is preferable because it allows for improvements in stability at even higher temperatures.

The platinum compound suppresses torque variation even when the composition is used at a high temperature for an extended period of time. Suitable platinum compounds include chloroplatinic acid, alcohol solutions of chloroplatinic acid, olefin complexes of platinum, carbonyl complexes of platinum, and alkenylsiloxane complexes of platinum.

The amount of platinum compound is such that it provides 0.1 to 1,000 ppm by weight of platinum metal, based on the weight of the organopolysiloxane liquid. Preferably, the amount of platinum compound provides 0.1 to 500 ppm of platinum metal.

A mixture of two or more heat resistant additives, and the like, can be added to this composition. For example, organosiloxane compounds containing zirconium atoms, organosiloxane compounds containing cerium atoms, organopolysiloxanes having aromatic amino groups, and others, can be added to this composition as optional components.

This composition has little torque variation even when used at a high temperature for an extended period of time. This composition also has excellent torque transfer characteristics, which make it appropriate for viscous couplings used in automobiles.

EXAMPLES

These examples are intended to illustrate the invention to those skilled in the art and should not be interpreted as limiting the scope of the invention set forth in the claims. Viscosities were obtained at 25° C.

Example 1

An organopolysiloxane composition for viscous fluid couplings was prepared by homogeneously mixing a 5 wt % isopropyl alcohol solution of chloroplatinic acid with trimethylsiloxy-endblocked dimethylpolysiloxane having a viscosity of 200 sq mm/s. The amount of platinum metal by weight was 10 ppm.

Approximately 100 g of this organopolysiloxane composition was used in a coupling designed with mutually engaged fins on concentric disks with a diameter of 12 cm. Readings of the torque generated during rotation at 3,000 rpm in atmosphere at 280° C. were taken from an ammeter, the change in torque was evaluated in terms of the rate of change relative to the initial value, and the results are in Table 1.

Example 2

An organopolysiloxane composition was prepared by homogeneously mixing a 1,3-divinyltetramethyldisiloxane complex of platinum with a platinum metal content of 4 weight % with trimethylsiloxy-endblocked dimethylpolysiloxane having a viscosity of 13,000 sq mm/s. The composition contained 5 ppm by weight of platinum metal. This organopolysiloxane composition was evaluated in the same manner as in Example 1, and the results are in Table 1.

Example 3

An oily organopolysiloxane with a viscosity of 4,200 sq mm/s was prepared by mixing two copolymers. The first copolymer was present at 80 parts by weight and was a trimethylsiloxy-endblocked copolymer of diphenylsiloxane (content of diphenylsiloxane units=15 mol %) and a dimethylsiloxane. Viscosity of the first copolymer was 7,000 sq mm/s. The second copolymer was present at 20 parts by weight and was a trimethylsiloxy-endblocked copolymer of diphenylsiloxane (content of diphenylsiloxane units=15 mol %) and dimethylsiloxane. Viscosity of the second copolymer was 130 sq mm/s.

An organopolysiloxane composition was prepared by homogeneously mixing a 1,3-divinyltetramethyldisiloxane complex of platinum, with a platinum metal content of 4 weight %, with the oily organopolysiloxane such that the amount of platinum metal in the composition was 5 ppm by weight. This organopolysiloxane composition was evaluated in the same manner as in Example 1, and the results are in Table 1.

Comparative Example 1

A trimethylsiloxy-endblocked dimethylpolysiloxane with a viscosity of 200 sq mm/s was used evaluated in the same manner as in Example 1, and the results are in Table 1.

Comparative Example 2

An oily organopolysiloxane with a viscosity of 4,200 sq mm/s was prepared by mixing two copolymers. The first copolymer was present at 80 parts by weight and had a viscosity of 7,000 sq mm/s. The first copolymer was a trimethylsiloxy-endblocked copolymer of diphenylsiloxane (content of diphenylsiloxane units=15 mol %) and dimethylsiloxane. The second copolymer had a viscosity of 130 sq mm/s and was present at 20 parts by weight. The second copolymer was a trimethylsiloxy-endblocked copolymer of diphenylsiloxane (content of diphenylsiloxane units=15 mol %) and dimethylsiloxane.

An organopolysiloxane composition was prepared by mixing 0.5 parts by weight of an N,N-ditolyl-p-phenylenediamine mixture (a dark brown viscous liquid consisting of a mixture of N,N'-di(o-tolyl)-p-phenylenediamine, N,N'-di(m-tolyl)-p-phenylenediainine, and N,N'-(p-tolyl)-p-phenylenediamine) with 100 parts by weight of the oily organopolysiloxane for 5 minutes in a nitrogen atmosphere under heating at 80° C. The resulting organopolysiloxane was evaluated in the same manner as in Example 1, and the results are in Table 1.

TABLE 1

| Rate of change of torque (%) | 24 hrs later | 48 hrs later | 72 hrs later | 96 hrs later |
|---|---|---|---|---|
| Example 1 | −23 | −35 | +51 | Gelling |
| Example 2 | −18 | +8 | +80 | +189 |
| Example 3 | −13 | −21 | +11 | +108 |
| Comparative Example 1 | −31 | +11 | Gelling | |
| Comparative Example 2 | −11 | Gelling | | |

We claim:

1. A process for suppressing torque variation of an organopolysiloxane composition for viscous fluid couplings comprising: adding a platinum compound to a composition consisting essentially of an organopolysiloxane liquid; wherein the organopolysiloxane liquid has a viscosity at 25° C. of 100 to 1,000,000 sq mm/s; the organopolysiloxane has organo- groups bonded to silicon atoms, with the proviso that the organo- groups are selected from the group consisting of substituted and unsubstituted monovalent hydrocarbon groups; the platinum compound is added in an amount such that 0.1 to 1,000 ppm of platinum metal, based on the weight of the organopolysiloxane liquid, is present; and wherein the platinum compound is selected from the group consisting of chloroplatinic acid, alcohol solutions of chloroplatinic acid, olefin complexes of platinum, carbonyl complexes of platinum, and alkenylsiloxane complexes of platinum.

2. The process of claim 1, wherein the organopolysiloxane liquid has a viscosity at 25° C. of 500 to 500,000 sq mm/s.

3. The process of claim 1, wherein the organopolysiloxane liquid comprises an organopolysiloxane liquid selected from the group consisting of trimethylsiloxy-endblocked dimethylpolysiloxane, trimethylsiloxy-endblocked copolymer of methylphenylsiloxane and dimethylsiloxane, trimethylsiloxy-endblocked copolymer of diphenylsiloxane and dimethylsiloxane, dimethylphenylsiloxy-endblocked copolymer of methylphenylsiloxane and dimethylsiloxane, and dimethylphenylsiloxy-endblocked copolymer of diphenylsiloxane dimethylsiloxane.

4. The process of claim 1, wherein the organopolysiloxane liquid is a mixture of two or more organopolysiloxane liquids.

5. The process of claim 4, wherein the organopolysiloxane liquid is a combination of a high-viscosity organopolysiloxane liquid and a low viscosity organopolysiloxane liquid.

6. The process of claim 1, wherein the platinum compound is added in an amount such that 0.1 to 500 ppm of platinum metal, based on the weight of the organopolysiloxane liquid, is present.

7. The process of claim 1, wherein the process further comprises adding to the organopolysiloxane liquid a mixture of two or more heat resistant additives selected from the group consisting of organosiloxane compounds containing zirconium atoms, organosiloxane compounds containing cerium atoms, and organopolysiloxanes having aromatic amino groups.

* * * * *